United States Patent
Song et al.

(10) Patent No.: US 12,401,917 B2
(45) Date of Patent: Aug. 26, 2025

(54) IMAGE PROCESSING DEVICE AND IMAGE CORRECTING METHOD

(71) Applicant: SK hynix Inc., Icheon-si (KR)

(72) Inventors: Jeong Yong Song, Icheon-si (KR); Dong Gyun Kim, Icheon-si (KR); Jae Yoon Yoo, Icheon-si (KR); Bo Ra Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 271 days.

(21) Appl. No.: 18/185,240

(22) Filed: Mar. 16, 2023

(65) Prior Publication Data

US 2024/0129641 A1 Apr. 18, 2024

(30) Foreign Application Priority Data

Oct. 18, 2022 (KR) .................. 10-2022-0133971

(51) Int. Cl.
- *G06K 9/00* (2022.01)
- *G06V 10/25* (2022.01)
- *G06V 10/74* (2022.01)
- *H04N 5/52* (2006.01)
- *H04N 23/86* (2023.01)
- *H04N 23/88* (2023.01)

(52) U.S. Cl.
CPC ............. *H04N 23/86* (2023.01); *G06V 10/25* (2022.01); *G06V 10/761* (2022.01); *H04N 5/52* (2013.01); *H04N 23/88* (2023.01)

(58) Field of Classification Search
None
See application file for complete search history.

(56) References Cited

U.S. PATENT DOCUMENTS

2018/0070020 A1* 3/2018 Rotte ................ H04N 23/76
2018/0374240 A1* 12/2018 Zhang ................... G06T 7/90
2019/0394408 A1* 12/2019 Tanaka .............. H04N 23/84

FOREIGN PATENT DOCUMENTS

KR 1020140071867 A 6/2014
KR 101980931 B1 5/2019

* cited by examiner

*Primary Examiner* — SJ Park
(74) *Attorney, Agent, or Firm* — WILLIAM PARK & ASSOCIATES LTD.

(57) ABSTRACT

An image processing device including: a gain value manager for generating white gain values corresponding to a plurality of positions, based on a sensing result of a predetermined white image; a target pixel manager for detecting saturated pixels, based on pixel values received from an external device, and determining target pixels as saturated white pixels of which each have a pixel value that indicates that the saturated white pixel is saturated, based on peripheral pixels of the saturated white pixels among the detected saturated pixels; and a target pixel corrector for changing pixel values of the target pixels, based on the white gain values and pixel values of the peripheral pixels.

26 Claims, 9 Drawing Sheets

IMAGE PROCESSING DEVICE AND IMAGE CORRECTING METHOD

CROSS-REFERENCE TO RELATED APPLICATION

The present application claims priority under 35 U.S.C. § 119(a) to Korean patent application number 10-2022-0133971, filed on Oct. 18, 2022, in the Korean Intellectual Property Office, the entire disclosure of which is incorporated herein by reference.

BACKGROUND

1. Technical Field

Various embodiment generally relate to an image processing device, and more particularly, to an image processing device and an image correcting method.

2. Related Art

An image sensor may be generally divided into a Charge Coupled Device (CCD) image sensor and a Complementary Metal Oxide Semiconductor (CMOS) image sensor. Recently, the CMOS image sensor which has a low manufacturing cost, consumes a low amount of power, and is easily integrated with a peripheral circuit has become desirable due to these features.

An image sensor included in a smartphone, a tablet PC, a digital camera, and the like may convert light reflected from an external object into an electrical signal, thereby acquiring image information on the external object. The image sensor may generate image data including phase information.

The availability of an image sensor including a white pixel is increasing in response to a low light level environment. In the image sensor including the white pixel, image quality deterioration may occur due to saturation of the white pixel in a high light level environment. Since the wavelength of light received by the white pixel is wide, the white pixel may be saturated more rapidly than other color pixels. Accordingly, it is necessary to correct a pixel value of the saturated white pixel through an image processing operation of an image processing device, thereby improving the quality of an image.

SUMMARY

In accordance with an embodiment of the present disclosure, there may be provided an image processing device including: a gain value manager configured to generate white gain values corresponding to a plurality of positions, based on a sensing result of a predetermined white image; a target pixel manager configured to detect saturated pixels, based on pixel values received from an external device, and determine target pixels as saturated white pixels of which each have a pixel value that indicates that the saturated white pixel is saturated, based on peripheral pixels of the saturated white pixels among the detected saturated pixels; and a target pixel corrector configured to change pixel values of the target pixels, based on the white gain values and pixel values of the peripheral pixels.

In accordance with an embodiment of the present disclosure, there may be provided an image correcting method including: generating white gain values corresponding to a plurality of positions, based on a sensing result of a predetermined white image; determining a target pixel as a saturated white pixel of which has a pixel value that indicates that the saturated white pixel is saturated, based on peripheral pixels of saturated pixels detected based on pixels values received from an external device among the detected saturated pixels; and changing a pixel value of the target pixel, based on the white gain values and pixel values of the peripheral pixels.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, examples of embodiments of the present disclosure will be described in detail with reference to the accompanying drawings in order for those skilled in the art to be able to readily implement the technical spirit of the present disclosure.

Various embodiments provide an image processing device and an image correcting method, in which an image is corrected by generating white gain values for an image sensor, determining a target pixel in which only a white pixel among detected saturated pixels is saturated, and changing a pixel value of the saturated white pixel, using peripheral pixel values of the target pixel.

Figure 1:
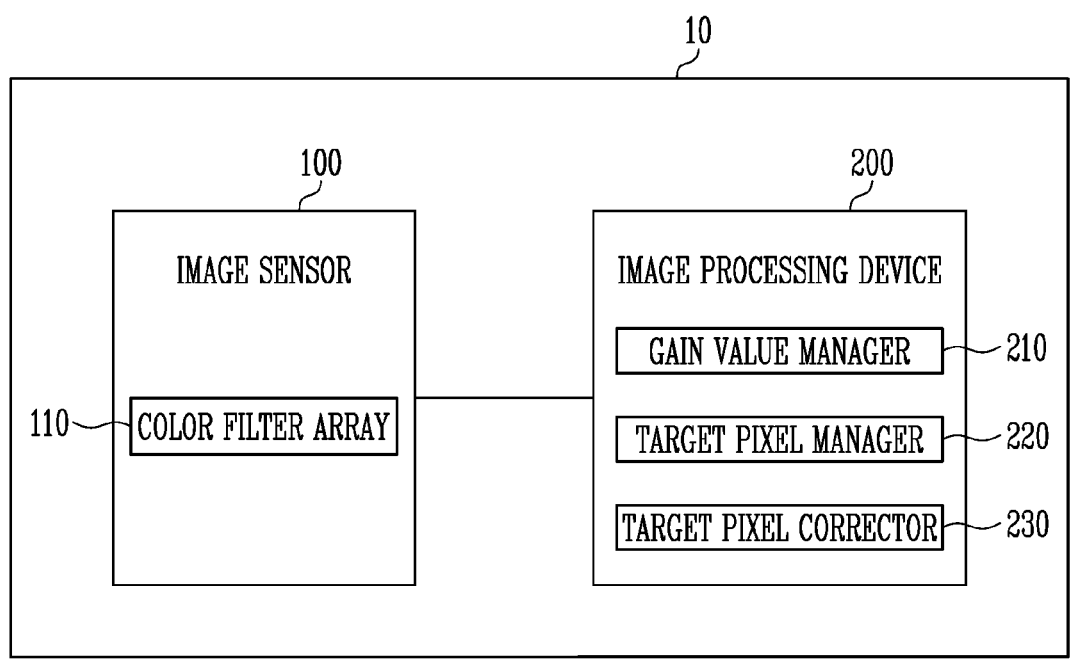
FIG. 1 is a diagram illustrating an image processing system in accordance with an embodiment of the present disclosure.

FIG. 1 is a diagram illustrating an image processing system in accordance with an embodiment of the present disclosure.

Referring to FIG. 1, the image processing system 10 may include an image sensor 100 and an image processing device 200.

The image processing system 10 in accordance with an embodiment of the present disclosure may acquire an image. Also, the image processing system 10 may store or display an output image obtained by processing the image, or output the output image to an external device. The image processing system 10 in accordance with an embodiment of the present disclosure may output the output image to a host according to a request of the host.

The image sensor 100 may generate image data about an object input through a lens. The lens may include at least one lens forming an optical system.

The image sensor 100 may include a pixel array including a plurality of pixels. The pixel array may include a color filter array 110 corresponding to each of the plurality of pixels. The color filter array 110 may allow light corresponding to a predetermined wavelength to pass therethrough. The light passing through the color filter array 110 may represent a specific color. The wavelength of light incident onto each of the plurality of pixels may vary according to a pattern of the color filter array 110. The word "predetermined" as used herein with respect to a parameter, such as a predetermined wavelength, white image, reference value, value, or size, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment of the present disclosure, color pixels which generate a pixel value by receiving light of a specific color may be included in the image sensor 100. The image sensor 100 may include a red pixel, a green pixel, a blue pixel, and a white pixel. In another embodiment of the present disclosure, the image sensor 100 may further include a cyan pixel, a magenta pixel, and the like.

The image sensor 100 may transmit, to the image processing device 200, image data including pixel values and information on the color filter array 110. The image processing device 200 may acquire information on a color and a brightness of each of the plurality of pixels, based on the image data.

The image processing device 200 may include a gain value manager 210, a target pixel manager 220, and a target pixel corrector 230. In an embodiment of the present disclosure, the image processing device 200 may correct a pixel value of a saturated white pixel by using peripheral pixel values.

The gain value manager 210 may generate white gain values corresponding to a plurality of positions, based on a sensing result of a predetermined white image. The gain value manager 210 may set calculation areas having a predetermined size inside the white image. Each of the calculation areas may be a part of the predetermined white image. The gain value manager 210 may calculate white gain values corresponding to each of the calculation areas.

The gain value manager 210 may locate the calculation areas such that a distance between the calculation areas is constant. The gain value manager 210 may calculate some of white gain values for the image sensor 100.

The gain value manager 210 may calculate each of average pixel values of pixels having the same color in the calculation areas. The gain value manager 210 may determine, as white gain values, ratios of an average pixel value of white pixels and a sum of average pixel values of the other pixels. The gain value manager 210 may determine, as the white gain value, a value obtained by dividing the average pixel value of the white pixels by the sum of the average pixel values of the other pixels. In another embodiment of the present disclosure, the gain value manager 210 may determine, as the white gain value, a value obtained by dividing the sum of the average pixel values of the other pixels by the average pixel value of the white pixels.

The gain value manager 210 may generate a gain value table for the image sensor 100, based on the plurality of positions and the white gain values. The gain value table may include white gain values and position information with respect to white pixels included in the image sensor 100.

The gain value manager 210 may further include a storage which stores the gain value table. For example, in an embodiment, the storage may be memory configured for storing data or a memory array configured for storing data. In an embodiment, the data may correspond to various values. The gain value manager 210 may adjust the distance between the calculation areas, based on the capacity of the storage. In another embodiment of the present disclosure, the gain value manager 210 may store white gain values for all white pixels included in the image sensor 100.

The target pixel manager 220 may detect saturated pixels, based on pixel values received from the outside. The target pixel manager 220 may determine target pixels as white pixels of which pixel value is saturated, based on peripheral pixels of the saturated pixels among the saturated pixels.

The target pixel manager 220 may determine, as saturated pixels, pixels of which pixel value exceeds a predetermined reference value among the plurality of pixels. The target pixel manager 220 may determine different reference values according to colors corresponding to a pixel. The target pixel manager 220 may determine saturated pixels among the plurality of pixels, based on the determined reference values.

The target pixel manager 220 may set a decision area corresponding to the white pixel among the saturated pixels. The target pixel manager 220 may calculate a white gain value corresponding to the white pixel among the saturated pixels, based on white gain values. The target pixel manager 220 may determine a size of the decision area, based on the white gain value. In another embodiment of the present disclosure, the target pixel manager 220 may determine the size of the decision area according to the pattern of the color filter array 110 included in the image sensor 100.

The target pixel manager 220 may determine, as peripheral pixels, the other pixels except white pixels among pixels included in the decision area. The target pixel manager 220 may check whether the peripheral pixels have been saturated. The target pixel manager 220 may determine a center pixel of the decision area as a target pixel, corresponding to that the peripheral pixels included in the decision area are not all saturated. In an embodiment of the present disclosure, the target pixel manager 220 may allow a white pixel as the center pixel of the decision area to be included in target pixels, corresponding to that the peripheral pixels are not included in the saturated pixels.

The target pixel corrector 230 may change pixel values of the target pixels, based on the white gain values and pixel values of the peripheral pixels. The target pixel corrector 230 may determine target gain values as white gain values corresponding to each of the target pixels. The target pixel corrector 230 may calculate average pixel values of pixels having the same color among peripheral pixels corresponding to each of the target pixels. The target pixel corrector 230 may determine, as the pixel values of the target pixels, values obtained by multiplying a sum of average pixel values of the peripheral pixels and the target gain values.

The target pixel corrector 230 may generate corrected image data by changing the pixel values of the saturated white pixels. The target pixel corrector 230 can reduce an image quality deterioration phenomenon of original data.

Figure 2:
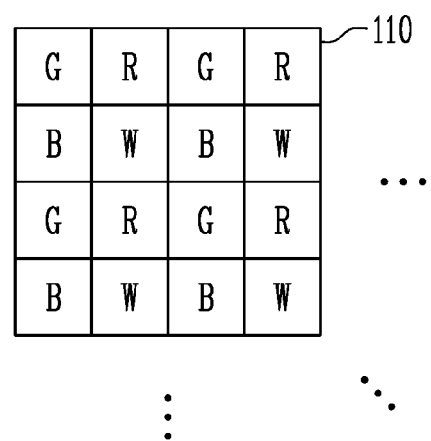
FIG. 2 is a diagram illustrating a color filter array included in an image sensor shown in FIG. 1 in accordance with an embodiment of the present disclosure.

FIG. 2 is a diagram illustrating a color filter array included in the image sensor shown in FIG. 1 in accordance with an embodiment of the present disclosure.

Referring to FIG. 2, the image sensor 100 may include a color filter array 110. The color filter array 110 may be included in the pixel array. The color filter array 110 may have various arrangements. Only one embodiment among the arrangements of the color filter array 110 is illustrated in FIG. 2, and the arrangement of the color filter array 110 is not limited to FIG. 2.

In the color filter array 110, four pixels may be repeatedly arranged. The four pixels may be a green pixel G, a red pixel R, a blue pixel B, and a white pixel W. In an embodiment of the present disclosure, the color filter array 110 may include yellow pixels, cyan pixels, or magenta pixels. Eight or sixteen color pixels may be repeatedly arranged as indicated in FIG. 2 by the ' . . . '. The yellow pixel may be arranged in the arrangement of the color filter array 110 in replacement of the green pixel. The yellow pixel may have a sensitivity higher than a sensitivity of the green pixel. In another embodiment of the present disclosure, the image processing device 200 may correct a pixel value of a saturated white pixel by using yellow pixel values, red pixel values, and blue pixel values. The image processing device 200 may change pixel values corresponding to the yellow pixels to pixel values corresponding to the green pixels, based on similarity between the yellow pixel and the green pixel and correlation between the yellow pixel and the red pixel. The image processing device 200 may correct the pixel value of the saturated white pixel by using the changed pixel values.

A rate of white pixels included in the color filter array 110 may be a predetermined value. For example, in FIG. 2, the rate of the white pixels included in the color filter array 110 may be, for example but not limited to, 25%.

In an embodiment of the present disclosure, the rate of the white pixels included in the color filter array 110 may be, for example but not limited to, 50%. For example, eight pixels may be repeatedly arranged in the color filter array 110, corresponding to that the rate of the white pixels is 50%.

The pixel value of the saturated white pixel may be corrected based on pixel values of peripheral pixels. In an embodiment, as the rate of the white pixels included in the color filter array 110 becomes smaller, the accuracy of the corrected pixel value may be improved. When the rate of the white pixels included in the color filter array 110 is, for example but not limited to, 75% or more, the pixel value of the saturated white pixel might not be corrected.

The color filter array 110 may allow light having a predetermined wavelength to pass therethrough. The light passing through the color filter array 110 may arrive at pixels. The pixels may generate pixel values corresponding to the light passing through the color filter array 110.

Figure 3:
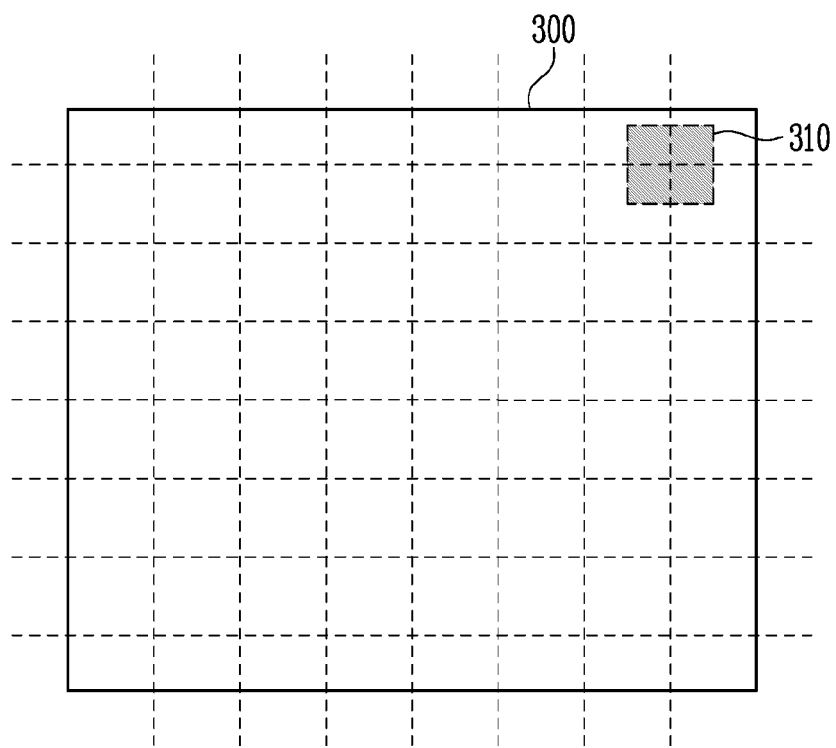
FIG. 3 is a diagram illustrating white gain values in accordance with an embodiment of the present disclosure.

FIG. 3 is a diagram illustrating white gain values in accordance with an embodiment of the present disclosure.

Referring to FIG. 3, the image sensor may sense a predetermined white image 300. The gain value manager may generate white gain values, based on a sensing result of the white image 300. A gain value generating operation may be performed only once, and the gain value manager may store the generated white gain values in the storage.

The gain value manager may set a calculation area for white gain value calculation in the white image 300. The gain value manager may set the calculation area 310 to be provided in plurality. The gain value manager may form virtual horizontal axes and virtual vertical axes, and set the calculation area 310 using, as a center point, an intersection point of a horizontal axis and a vertical axis. The calculation area 310 may be used for white gain value calculation with respect to the center point. The center point of the calculation area 310 may be a white pixel.

Although seven horizontal axes (i.e., as indicated by the dotted horizontal lines) and seven vertical axes (i.e., as indicated by the dotted vertical lines) are illustrated in FIG. 3, this is merely illustrative, and the number of horizontal axes and vertical axes, which are formed on the white image 300, may vary. Similarly, the distance between horizontal axes and the distance between vertical axes may vary.

In FIG. 3, the gain value manager may form 49 calculation areas. A distance between the 49 generated calculation areas may be constant. The gain value manager may calculate a white gain value by using pixel values included in the calculation area 310.

For example, it may be assumed that sixteen pixel are included in the calculation area 310. Four white pixels, four red pixels, four green pixels, and fourth blue pixels may be included in the calculation area 310. The gain value manager may calculate each of an average pixel value Wavg of the four white pixels, an average pixel value Ravg of the four red pixels, an average pixel value Gavg of the four green pixels, and an average pixel value Bavg of the four blue pixels. The gain value manager may determine, as a white gain value, a ratio of the average pixel value Wavg of the white pixels and a sum RGBsum of the average pixel values of the other pixels. The sum RGBsum of the average pixel values of the other pixels may be represented as follows.

$$RGBsum = Ravg + Gavg + Bavg$$

In an embodiment of the present disclosure, the gain value manager may determine, as the white gain value, a value obtained by dividing the average pixel value Wavg of the white pixels by the sum RGBsum of the average pixel values of the other pixels. This is represented as follows.

$$gain = Wavg/RGBsum$$

In another embodiment of the present disclosure, the gain value manager may determine, as the white gain value, a value obtained by dividing the sum RGBsum of the average pixel values of the other pixels by the average pixel value Wavg of the white pixels. This is represented as follows.

$$gain = RGBsum/Wavg$$

In FIG. 3, the gain value manager may calculate white gain values respectively in the 49 calculation areas. The gain value manager may generate a gain value table, based on the white gain values. The gain value table may include information representing a white gain value and a position thereof.

The gain value manager may store the gain value table in the storage. The gain value manager may adjust a distance between the calculation areas according to a capacity of the storage. As the capacity of the storage becomes larger, the distance between the calculation areas may be narrowed, and the number of the calculation areas may increase.

In another embodiment of the present disclosure, the gain value manager may generate and store white gain values for all white pixels included in the image sensor. The gain value manager may calculate some of white gain values, based on set calculation areas, and calculate the white gain values for all the white pixels by interpolating between the calculated white gain values.

In an embodiment of the present disclosure, the gain value manager may determine a size of the calculation area 310, based on the color filter array. Specifically, the size of the calculation area 310 may be greater than a size of a repeated pattern of the color filter array. The gain value manager may set the calculation area 310 greater by an integer multiple than a basic pattern of the color filter array.

Similarly, the gain value manager may determine a number of horizontal axes and vertical axes, which are formed in the white image 300, based on the color filter array. The gain value manager may arrange the horizontal axes and the vertical axes such that a distance between the horizontal axes and a distance between the vertical axes become equal to or greater than an integer multiple of the basic pattern of the color filter array. The gain value manager may determine a number of the horizontal axes and the vertical axes such that the distance between the horizontal axes and the distance between the vertical axes are greater than the size of the calculation area 310. The gain value manager may arrange the horizontal axes and the vertical axes such that no overlapping calculation areas exist.

The resolution of an image in which a saturated pixel is corrected may vary according to a number of calculation areas generated by the gain value manager. As the number of the calculation areas becomes larger, the resolution of the image may be increased.

The accuracy of white gain values for the image sensor may vary according to a number of pixels included in the calculation area set by the gain value manager. As the number of pixels included in the calculation area becomes larger, the accuracy of a white gain value for white pixels included in the image sensor may be increased.

Figure 4:
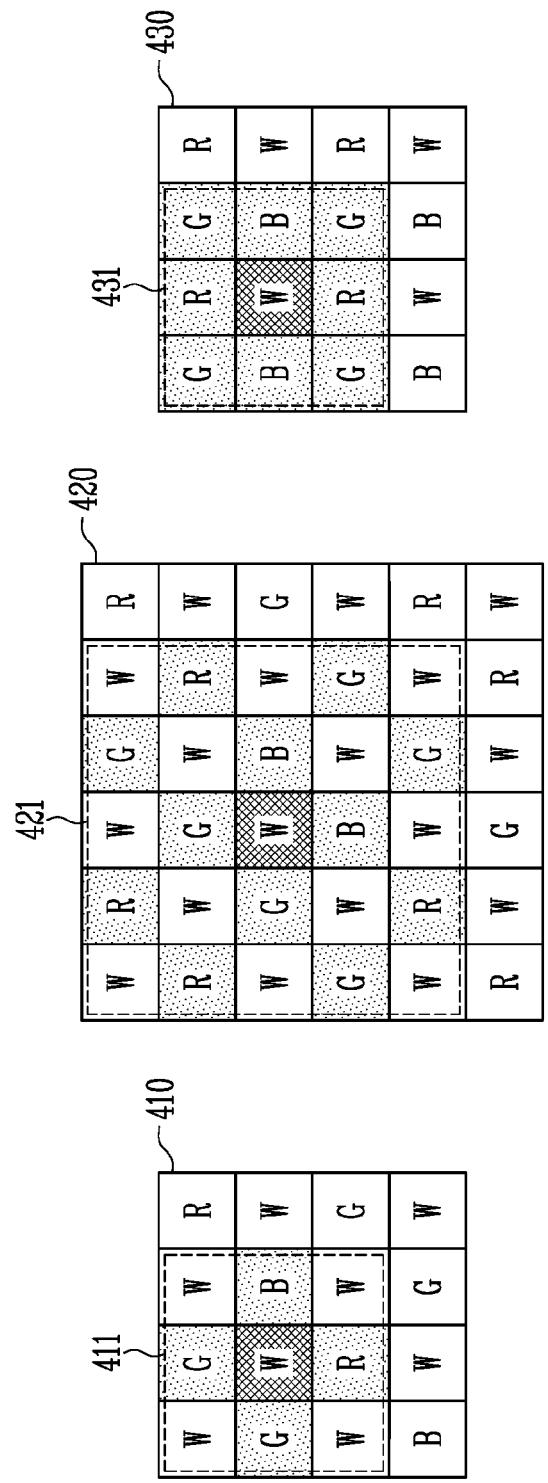
FIG. 4 is a diagram illustrating a method of correcting a pixel value of a saturated white pixel in accordance with an embodiment of the present disclosure.

FIG. 4 is a diagram illustrating a method of correcting a pixel value of a saturated white pixel in accordance with an embodiment of the present disclosure.

Referring to FIG. 4, basic patterns 410, 420, and 430 of the color filter array may be illustrated. The gain value manager may set decision areas 411, 421, and 431 corresponding to the basic patterns 410, 420, and 430. A first pattern 410 and a second pattern 420, in which the rate of white pixels included in the color filter array is 50%, and a third pattern 430 in which the rate of white pixels included in the color filter array is 25% may be illustrate in FIG. 4.

The target pixel manager may detect saturated pixels of which pixel values exceed a reference value among color pixels. The target pixel manager may differently determine a saturated reference value according to a color. In an embodiment of the present disclosure, a reference value corresponding to a white pixel may be greater than a reference value corresponding to the other pixels.

The target pixel manager may sort saturated pixels into a white pixel and the other pixels. The other pixels may be a red pixel, a green pixel, and a blue pixel. In another embodiment of the present disclosure, a cyan pixel or a magenta pixel may be included in the other pixels.

The target pixel manager may set a decision area corresponding to a white pixel of which has a pixel value that indicates that the white pixel is saturated. In an embodiment, the white pixel of which has the pixel value that indicates that the white pixel is saturated may be known as a saturated white pixel. The target pixel manager may determine a size of the decision area according to a white gain value corresponding to the saturated white pixel or a pattern of the color filter array.

In an embodiment of the present disclosure, when the pattern of the color filter array is the first pattern 410, the target pixel manager may set a first decision area 411. The first decision area 411 may include the saturated white pixel as a center pixel. The first decision area 411 may have a size of 3×3. Two green pixels, one red pixel, and one blue pixel may be included in the first decision area 411. The two green pixels, the one red pixel, and the one blue pixel, which are included in the first decision area 411, may be peripheral pixels of the saturated white pixel. A white pixel indicated by shading in the first decision area 411 may be the saturated white pixel.

In another embodiment of the present disclosure, when the second pattern 420 is repeated in the color filter array, the target pixel manager may set a second decision area 421. The second decision area 421 may include the saturated white pixel as a center pixel, and have a size of 5×5. The first decision area 411 and the second decision area 421 may be determined by a difference between the first pattern 410 and the second pattern 420. Six green pixels, four red pixels, and two blue pixels may be included in the second decision area 421. The six green pixels, the four red pixels, and the two blue pixels, which are included in the second decision area 421, may be peripheral pixels of the saturated white pixel.

In still another embodiment of the present disclosure, the third pattern 430 may be repeated in the color filter array. The target pixel manager may set a third decision area 431. The third decision area 431 may have a size of 3×3, and the size of the third decision area 431 may be equal to the size of the first decision area 411. The third decision area 431 may include four green pixels, two blue pixels, and two red pixels. The four green pixels, the two blue pixels, and the two red pixels, which are included in the third decision area 431, may be peripheral pixels of the saturated white pixel.

The size of a decision area may vary according to a pattern of the color filter array. Pixels included in the decision area may vary, and therefore, peripheral pixels of the saturated white pixel may vary.

In another embodiment of the present disclosure, the target pixel manager may change the size of the decision area, based on a white gain value corresponding to the saturated white pixel. For example, even when the first pattern 410 is repeated in the color filter array, the size of the first decision area 411 may vary according to the white gain value. The target pixel manager may determine the size of the first pattern 410 as 5×5, corresponding to that the white gain value exceeds a predetermined value. Similarly, even when the pattern of the color filter array corresponds to the second pattern 420 and the third pattern 430, the size of each of the second decision area 421 and the third decision area 431 may vary according to the white gain value.

The number of peripheral pixels included in a decision area may vary according to a size of the decision area. The size of the decision area may have influence on whether the saturated white pixel has been corrected. Only when the peripheral pixels included in the decision area are not all saturated pixels, a pixel value of the saturated white pixel as the center pixel may be corrected. The size of the decision area may have influence on the accuracy of the corrected white pixel value.

The target pixel manager may determine the saturated white pixel as a target pixel, corresponding to that the peripheral pixels are not all saturated pixels. Whether the other white pixels included in the decision area have been saturated may have no influence on target pixel determination. Specifically, the saturated white pixel as the center pixel may be included in target pixels only when the two green pixels, the one red pixel, and the one blue pixel, which are included in the first decision area 411, are not all saturated pixels. Similarly, the target pixel determine, as the target pixel, the saturated white pixel as the center pixel, corresponding to that the six green pixels, the four red pixels, and the two blue pixels, which are included in the second decision area 421, are all unsaturated pixels. The saturated white pixel as the central pixel may become the target pixel only when the four green pixels, the two blue pixels, and the two red pixels are not all saturated pixels.

The target pixel corrector may correct a pixel value of the target pixel by using a white gain value and pixel values of peripheral pixels. The target pixel corrector may determine a white gain value corresponding to the target pixel. The target pixel corrector may use the white gain value calculated by the target pixel manager. The target pixel corrector may determine peripheral pixels corresponding to the target pixel. The target pixel corrector may determine the peripheral pixels of the saturated white pixel determined by the target pixel manager as peripheral pixels of the target pixel. In an embodiment of the present disclosure, the peripheral pixels corresponding to the target pixel may be identical to the peripheral pixels of the saturated white pixel. Similarly, the target pixel corrector may use the decision area set by the target pixel manager.

The target pixel corrector may calculate an average pixel value of the peripheral pixels for each color. In an embodiment of the present disclosure, the target pixel corrector may calculate each of an average pixel value AvgR of red pixels, an average pixel value AvgG of green pixels, and an average pixel value AvgB of blue pixels, which are included in the decision area. The target pixel corrector may calculate a sum SumRGB of peripheral pixel average values as a sum of the average pixel value AvgR of the red pixels, the average pixel value AvgG of the green pixels, and the average pixel value AvgB of the blue pixels. This is represented as an equation as follows.

$$Sum RGB = AvgR + AvgG + AvgB$$

The target pixel corrector may determine the pixel value of the target pixel as a value obtained by multiplying a white gain value gain corresponding to the target pixel and the sum SumRGB of the peripheral pixel average values. This is represented as an equation as follows.

$$Wsat = gain * Sum RGB$$

Wsat may represent the target pixel as the saturated white pixel.

Specifically, when the first pattern 410 is repeated in the color filter array, the white pixel indicated by shading may be the target pixel. The target pixel corrector may calculate an average pixel value AvgR of red pixels, an average pixel value AvgG of green pixels, and an average pixel value AvgB of blue pixels with respect to peripheral pixels included in the first decision area 411. The target pixel corrector may change the pixel value of the target pixel by using a value obtained by multiplying the white gain value gain and a sum SumRGB of peripheral pixel average values.

Similarly, when the second pattern 420 and the third pattern 430 are repeated in the color filter array, the target pixel corrector may correct the pixel value of the target pixel. The target pixel corrector may calculate an average pixel value AvgR of red pixels, an average pixel value AvgG of green pixels, and an average pixel value AvgB of blue pixels with respect to peripheral pixels included in the second decision area 421 or the third decision area 431, and change the pixel value of the target pixel by using a value obtained by multiplying the white gain value gain and a sum SumRGB of peripheral pixel average values.

The target pixel corrector may correct the pixel value of the saturated white pixel. In an embodiment, when saturated white pixels are corrected, a blur phenomenon or a deviated color phenomenon in the entire image can be reduced. In addition, in an embodiment, details of an image can be increased corresponding to the correction of a saturated white pixel.

In an embodiment of the present disclosure, the first pattern 410, the second pattern 420, and the third pattern 430 are merely embodiments, and the color filter array may have various patterns. The size of the decision area and the peripheral pixels may vary according to the pattern of the color filter array.

Figure 5:
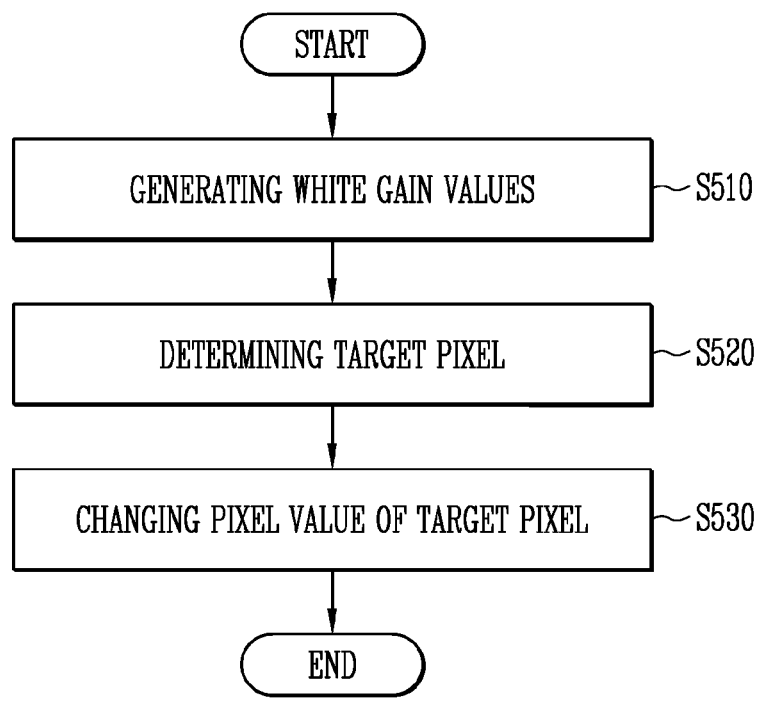
FIG. 5 is a flowchart illustrating an image correcting method in accordance with an embodiment of the present disclosure.

FIG. 5 is a flowchart illustrating an image correcting method in accordance with an embodiment of the present disclosure.

Referring to FIG. 5, the image processing device may pre-calculate white gain values for white pixels included in the image sensor. The image processing device may correct a pixel value of saturated white pixels by using a white gain value. In an embodiment, the image processing device may correct the saturated white pixels, thereby improving the power of expression of an image.

In step S510, the gain value manager may generate white gain values for white pixels included in the image sensor. The gain value manager may generate white gain values corresponding to a plurality of positions, based on a sensing result of a predetermined white image. The gain value manager may generate some of the white gain values for the white pixels, and calculate white gain values of all white pixels by interpolating the generated white gain values.

In step S520, the target pixel manager may detect saturated pixels among pixels, and determine a target pixel of which pixel value is corrected among the saturated pixels by using peripheral pixels of the saturated pixels. The target pixel manager may determine, as the saturated pixels, pixels of which pixel values exceed a predetermined reference value. The target pixel manager may sort the saturated pixels into saturated white pixels and the other pixels. The target pixel manager may determine a saturated white pixel as the target pixel, corresponding to that peripheral pixels of the saturated white pixels are not all saturated pixels.

In step S530, the target pixel corrector may change a pixel value of the target pixel, based on a white gain value for the target pixel and pixel values of the peripheral pixels. The target pixel corrector may calculate each of average pixel values of pixels having the same color among the peripheral pixels, and add up the calculated average pixel values. The target pixel corrector may determine, as the pixel value of the target pixel, a value obtained by multiplying a sum of peripheral pixel average values and the white gain value.

Figure 6:
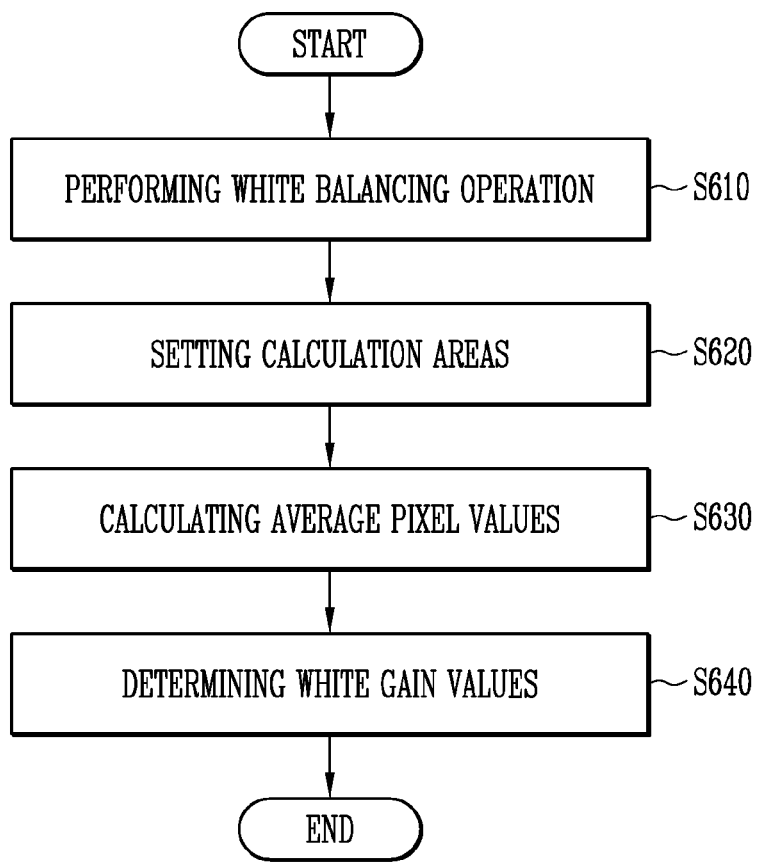
FIG. 6 is a flowchart illustrating a method of generating white gain values in accordance with an embodiment of the present disclosure.

FIG. 6 is a flowchart illustrating a method of generating white gain values in accordance with an embodiment of the present disclosure.

Referring to FIG. 6, the gain value manager may generate white gain values for white pixels included in the image sensor. The gain value manager may generate and store a gain value table including information on positions and gain values for the white pixels.

In step S610, the gain value manager may perform a white balancing operation of adjusting a rate of pixel values for colors, based on a sensing result. The gain value manager may change red pixel values of a white image by multiplying each of the red pixel values by a rate of green pixel values with respect to the red pixels values. The gain value manager may change blue pixel values of the white image by multiplying each of blue pixel values by a rate of the green pixel values with respect to the blue pixel values.

The white balancing operation may correct an error according to a sensor intensity difference of the image sensor for each color. For example, a green pixel may have a sensor intensity higher than a sensor intensity of a red pixel or a blue pixel. The green pixel value having a high sensor intensity may have a magnitude greater than a magnitude of the red pixel value or the blue pixel value. An error according to the sensor intensity is corrected, so that magnitude differences between the green, red, and blue pixel values can be reduced.

When the white balancing operation is performed, the green pixel values, the red pixel values, and the blue pixel values may be included in a specific range. The rates of the green pixel values, the red pixel values, and the blue pixel values, on which the white balancing operation is performed, may become similar to one another.

In step S620, the gain value manager may set calculation areas for white gain value calculation inside a predetermined white image. The gain value manager may determine a size of the calculation areas, based on a pattern of the color filter array included in the image sensor. The gain value manager may constantly maintain a distance between the calculation areas. The gain value manager may generate virtual horizontal axes and virtual vertical axes in the white image, and generate a calculation area for each intersection point of a horizontal axis and a vertical axis.

In step S630, the gain value manager may calculate average pixel values of pixels included in the calculation areas with respect to colors. The gain value manager may calculate each of an average pixel value of white pixels, an average pixel value of red pixels, an average pixel value of green pixels, and an average pixel value of blue pixels. The number of pixels for each color, which are included in a calculation area, may vary according to the pattern of the color filter array.

In step S640, the gain value manager may determine white gain values corresponding to the calculation area, based on the average pixel values with respect to the colors. The gain value manager may determine, as a white gain value, a ratio of a sum of the average pixel value of the red pixels, the average pixel value of the green pixels, and the average pixel value of the blue pixels, and the average pixel value of the white pixels. In an embodiment of the present disclosure, the gain value manager may determine, as a white gain value corresponding to the calculation area, a value obtained by dividing the average pixel value of the white pixels by the sum of the average pixel value of the red pixels, the average pixel value of the green pixels, and the average pixel value of the blue pixels.

Figure 7:
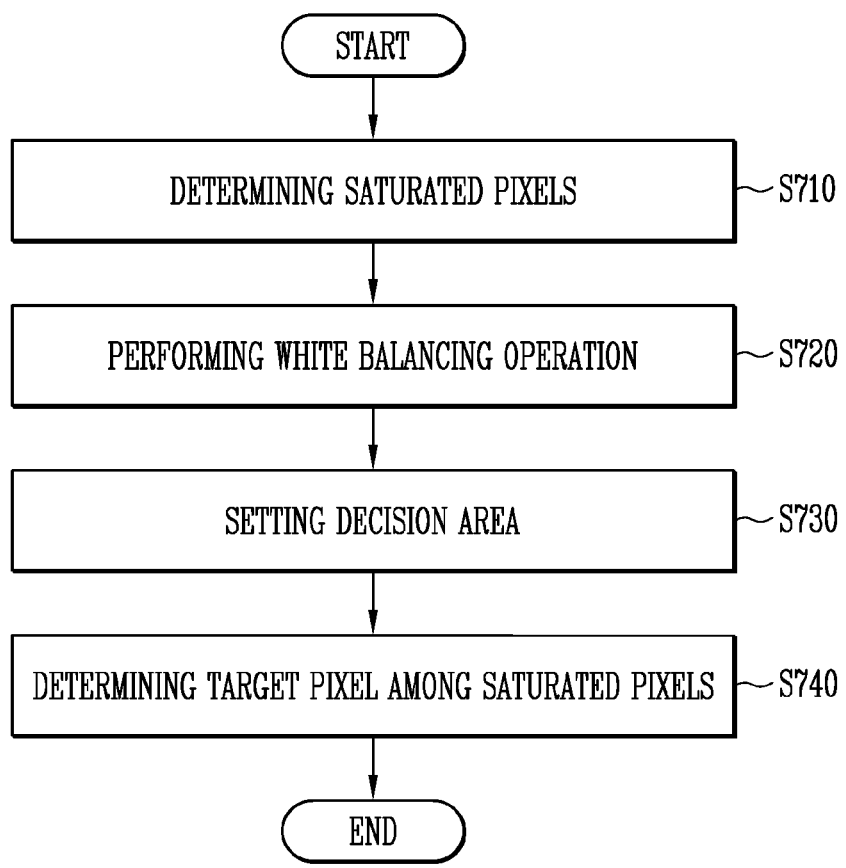
FIG. 7 is a flowchart illustrating a method of determining a target pixel in accordance with an embodiment of the present disclosure.

FIG. 7 is a flowchart illustrating a method of determining a target pixel in accordance with an embodiment of the present disclosure.

Referring to FIG. 7, the target pixel manager may detect saturated pixels among pixels, based on pixel values, and determine a target pixel among the saturated pixels. Since a pixel value of the target pixel is corrected, only a saturated white pixel of which peripheral pixels are not saturated may be determined as the target pixel.

In step S710, the target pixel manager may determine, as saturated pixels, pixels of which pixel values exceed a predetermined reference value among a plurality of pixels. The target pixel manager may determine the reference value to vary according to a color. Specifically, the target pixel manager may determine a reference value for a white pixel to be higher than a reference value for another color pixel.

In step S720, the target pixel manager may perform a white balancing operation on normal pixels except saturated pixels among the plurality of pixels. The normal pixels may be pixels that are not determined as saturated pixels by the target pixel manager. Pixel values of the normal pixels might not exceed a reference value. The target pixel manager may calculate a first rate of green pixel values with respect to red pixel values and a second rate of the green pixel values with respect to blue pixel values, based on pixel values of the normal pixels. The target pixel manager may change the red pixel values by multiplying each of the red pixel values by the first rate. The target pixel manager may change the blue pixel values by multiplying each of the blue pixel values by the second rate.

In step S730, the target pixel manager may set a decision area corresponding to the white pixel among the saturated pixels. The target pixel manager may set the decision area, based on a pattern of the color filter array or a saturated white pixel. For example, the size of the decision area may vary according to the pattern of the color filter array. The target pixel manager may increase the size of the decision area as a white gain value becomes larger.

In step S740, the target pixel manager may determine the saturated white pixel as a target pixel according to whether the other pixels instead of the white pixel among pixels included in the decision area have been saturated. The target pixel manager may allow the saturated white pixel to be included in the target pixel, corresponding to that the other pixels included in the decision area are not all saturated pixels. In an embodiment of the present disclosure, the other pixels included in the decision area may be red pixels, green pixels, and blue pixels, which are included in the decision area. In another embodiment of the present disclosure, peripheral pixels of the saturated white pixel may include a cyan pixel or a magenta pixel.

Figure 8:
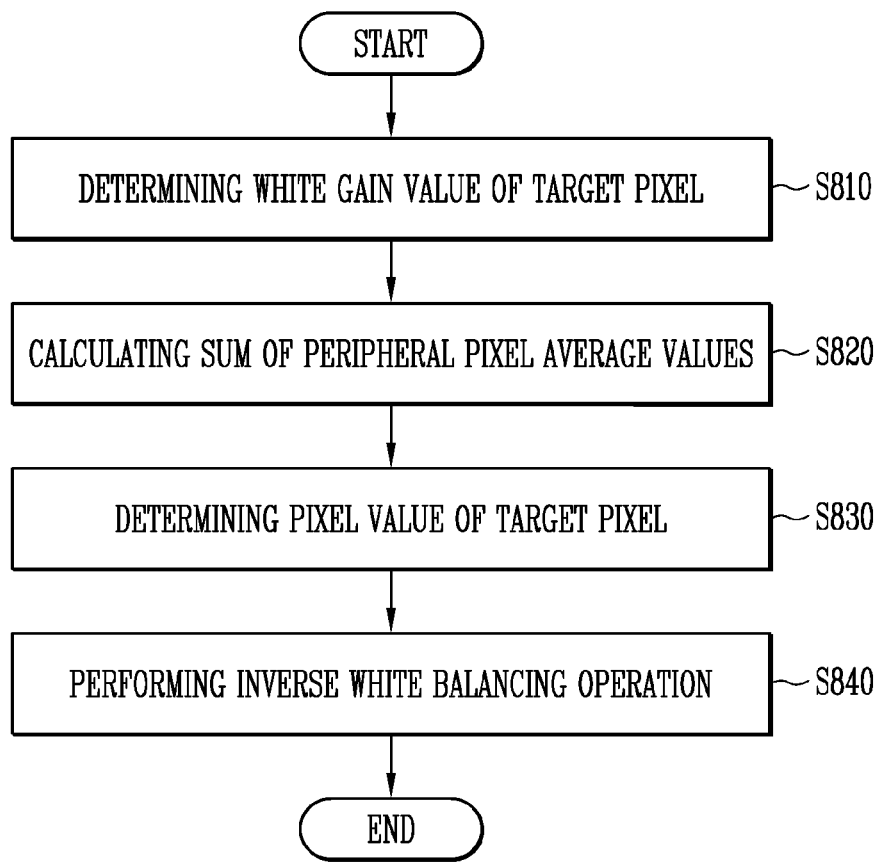
FIG. 8 is a flowchart illustrating a method of changing a target pixel value in accordance with an embodiment of the present disclosure.

FIG. 8 is a flowchart illustrating a method of changing a target pixel value in accordance with an embodiment of the present disclosure.

Referring to FIG. 8, the target pixel corrector may change the pixel value of the target pixel, based on a white gain value and pixel values of peripheral pixels. The target pixel corrector may change the pixel value of the saturated white pixel and output a corrected image. The corrected image may be an image in which a blur phenomenon and a deviated color phenomenon are reduced.

In step S810, the target pixel corrector may determine a white gain value corresponding to the target pixel. The target pixel corrector may calculate the white gain value corresponding to the target pixel, based on the white gain values generated by the gain value manager. Specifically, the target pixel corrector may calculate the white gain value corresponding to the target pixel by interpolating between the white gain values.

In step S820, the target pixel corrector may calculate average pixel values of peripheral pixels with respect to colors. The target pixel corrector may calculate each of an average pixel value of red pixels, an average pixel value of green pixels, and an average pixel value of blue pixels, which are included in a decision area. In an embodiment of the present disclosure, the target pixel corrector may calculate a sum of peripheral pixel average values as a sum of the average pixel value of the red pixels, the average pixel value of the green pixels, and the average pixel value of the blue pixels.

In step S830, the target pixel corrector may correct a pixel value of the target pixel. The target pixel corrector may determine, as the pixel value of the target pixel, a value obtained by multiplying the white gain value corresponding to the target pixel and the sum of the peripheral pixel average values. The target pixel corrector may correct a pixel value of a saturated white pixel, thereby outputting a corrected image. A resolution of the corrected image may be increased as compared with a resolution of an image before correction in a low luminance or high luminance environment.

In step S840, the target pixel corrector may perform an inverse white balancing operation on normal pixels. The target pixel corrector may change red pixel values by multiplying pixel values of red pixels among the normal pixels by a reciprocal of the first rate. The target pixel corrector may change blue pixel values by multiplying pixel values of blue pixels among the normal pixels by a reciprocal of the second rate.

In the embodiment of the present disclosure, the white balancing operation is performed on pixel values of a sensed image, so that the accuracy of saturated pixel correction can be improved. The inverse white balancing operation on the normal pixels is performed after the saturated pixel correction, so that an original sensing result can be maintained.

Figure 9:
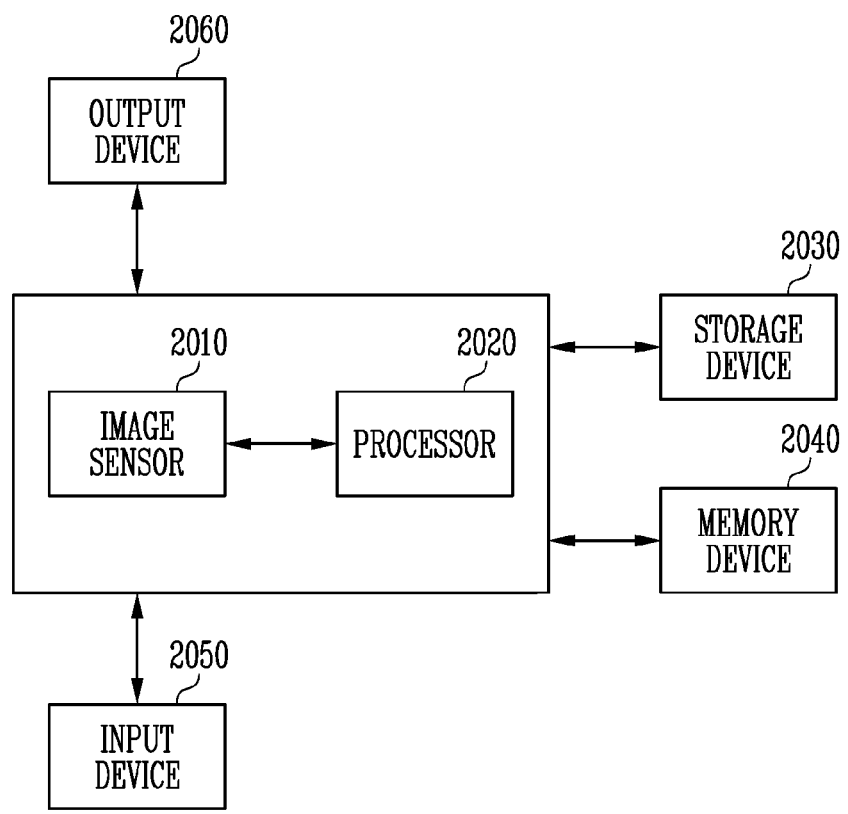
FIG. 9 is a block diagram illustrating an electronic device including an image processing system in accordance with an embodiment of the present disclosure.

FIG. 9 is a block diagram illustrating an electronic device including an image processing system in accordance with an embodiment of the present disclosure.

Referring to FIG. 9, the electronic device 2000 may include an image sensor 2010, a processor 2020, a storage device 2030, a memory device 2040, an input device 2050, and an output device 2060. Although not shown in FIG. 9, the electronic device 2000 may further include ports capable of communicating with a video card, a sound card, a memory card, a universal serial bus (USB) device, and the like, or communicating with other electronic devices.

The image sensor 2010 may generate image data corresponding to incident light. In an embodiment of the present disclosure, the image sensor 2010 may include white pixels. The white pixels may increase a resolution of a sensing image in a low luminance environment. The image data may be transferred to the processor 2020 to be processed by the processor 2020. The output device 2060 may display the image data. The storage device 2030 may store the image data. The processor 2020 may control operations of the image sensor 2010, the output device 2060, and the storage device 2030.

The processor 2020 may be an image processing device which performs a calculation of processing image data received from the image sensor 2010 and outputs the processed image data. The processing may be Electronic Image Stabilization (EIS), interpolation, color tone correction, image quality correction, size adjustment, or the like.

The processor 2020 may be implemented as a chip independent from the image sensor 2010. For example, the processor 2020 may be implemented with a multi-chip package. In another embodiment of the present disclosure, the processor 2020 may be included as a portion of the image sensor 2010 to be implemented as one chip.

The processor 2020 may execute and control an operation of the electronic device 2000. In accordance with an embodiment of the present disclosure, the processor 2020 may be a microprocessor, a Central Processing Unit (CPU), or an Application Processor (AP). The processor 2020 may be connected to the storage device 2030, the memory device 2040, the input device 2050, and the output device 2060 through an address bus, a control bus, and a data bus, to perform communication.

In an embodiment of the present disclosure, the processor 2020 may generate white gain values of the image sensor 2010. The processor 2020 may calculate some of the white gain values of the image sensor 2010, based on a sensing result of a predetermined white image. The processor 2020 may generate the white gain values of the image sensor 2010 by interpolating between the white gain values.

The processor 2020 may detect saturated pixels, based on pixel values, and determine target pixels to be corrected among saturated white pixels by using peripheral pixels of the saturated pixels. The processor 2020 may generate a decision area using a saturated white pixel as a center pixel, and correct a pixel value of the saturated white pixel, corresponding to that the other pixels except white pixels included in the decision area are not saturated. The processor 2020 may calculate average pixel values of pixels having the same color among peripheral pixels of the target pixel, and change, as a pixel value of the target pixel, a value obtained by multiplying a sum of the average pixel values and a white gain value corresponding to the target pixel.

The storage device 2030 may include a flash memory device, a Solid State Drive (SSD), a Hard Disk Drive (HDD), a CD-ROM, all types of nonvolatile memory devices, and the like.

The memory device 2040 may store data necessary for an operation of the electronic device 2000. For example, the memory device 2040 may include a volatile memory device such as a Dynamic Random Access Memory (DRAM) or a Static Random Access Memory (SRAM) and a nonvolatile memory device such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing a command set stored in the memory device 2040.

In an embodiment of the present disclosure, the memory device 2040 may store white gain values of the image sensor 2010. The memory device 2040 may store some of the white gain values or store all the white gain values.

The input device 2050 may include an input means such as a keyboard, a keypad, or a mouse, and the output device 2060 may include an output means such as a printer or a display.

The image sensor 2010 may be implemented with various types of packages. For example, components of at least a portion of the image sensor 2010 may be implemented by using packages such as Package-on-Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi-Chip Package (MCP), Wafer-level Fabricated Package (WFP), Wafer-level Processed Stack Package (WSP), and Wafer-level Processed Package (WSP).

Meanwhile, the electronic device 2000 may be interpreted as all computing systems using the image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with an embodiment of the present disclosure, there can be provided an image processing device capable of detecting saturated pixels, and correcting a pixel value of a saturated white pixel, using a white gain value and peripheral pixel values of the saturated white pixel.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing device comprising:
    a gain value manager configured to generate white gain values corresponding to a plurality of positions, based on a sensing result of a predetermined white image;
    a target pixel manager configured to detect saturated pixels, based on pixel values received from an external device, and determine target pixels as saturated white pixels of which each have a pixel value that indicates that the saturated white pixel is saturated, based on peripheral pixels of the saturated white pixels among the detected saturated pixels; and
    a target pixel corrector configured to change pixel values of the target pixels, based on the white gain values and pixel values of the peripheral pixels.

2. The image processing device of claim 1, wherein the gain value manager performs a white balancing operation of adjusting a rate of pixel values for colors, based on the sensing result.

3. The image processing device of claim 2, wherein the gain value manager sets calculation areas having a predetermined size inside the white image, and calculates the white gain values corresponding to each of the calculation areas.

4. The image processing device of claim 3, wherein the gain value manager locates the calculation areas such that a distance between the calculation areas is constant.

5. The image processing device of claim 3, wherein the gain value manager calculates each of average pixel values of pixels having the same color in the calculation areas, and determines, as the white gain values, ratios of an average pixel value of white pixels and a sum of average pixel values of the other pixels.

6. The image processing device of claim 5, wherein the gain value manager generates a gain value table for an image sensor, based on the plurality of positions and the white gain values, and further includes a storage configured to store the gain value table.

7. The image processing device of claim 6, wherein the gain value manager adjusts the distance between the calculation areas, based on a capacity of the storage.

8. The image processing device of claim 1, wherein the target pixel manager determines, as the detected saturated pixels, pixels which have a pixel value that exceeds a predetermined reference value among a plurality of pixels.

9. The image processing device of claim 8, wherein the target pixel manager determines different reference values according to colors corresponding to a pixel, and determines the detected saturated pixels, based on the reference values.

10. The image processing device of claim 8, wherein the target pixel manager performs a white balancing operation on normal pixels except the saturated pixels among the plurality of pixels.

11. The image processing device of claim 10, wherein the target pixel manager sets a decision area corresponding to a white pixel among the detected saturated pixels, determines, as the peripheral pixels, the other pixels except white pixels among pixels included in the decision area, and allows the white pixel to be included in the target pixels, corresponding to that the peripheral pixels are not included in the detected saturated pixels.

12. The image processing device of claim 11, wherein the target pixel manager calculates a white gain value corresponding to the saturated white pixel among the detected saturated pixels, based on the white gain values, and determines a size of the decision area, based on the white gain value.

13. The image processing device of claim 11, wherein the target pixel manager determines a size of the decision area according to a color filter array pattern included in an image sensor.

14. The image processing device of claim 11, wherein the target pixel corrector determines target gain values as white gain values corresponding to each of the target pixels, and calculates average pixel values of pixels having the same color among peripheral pixels corresponding to each of the target pixels.

15. The image processing device of claim 14, wherein the target pixel corrector determines, as pixel values of the target pixels, values obtained by multiplying a sum of the average pixel values of the peripheral pixels and the target gain values.

16. The image processing device of claim 15, wherein the target pixel corrector performs an inverse white balancing operation on the normal pixels, corresponding to the determination of the pixel values of the target pixels.

17. An image correcting method comprising:
generating white gain values corresponding to a plurality of positions, based on a sensing result of a predetermined white image;
determining a target pixel as a saturated white pixel of which has a pixel value that indicates that the saturated white pixel is saturated, based on peripheral pixels of saturated pixels detected based on pixels values received from an external device among the detected saturated pixels; and
changing a pixel value of the target pixel, based on the white gain values and pixel values of the peripheral pixels.

18. The image correcting method of claim 17, wherein the generating of the white gain values includes:
performing a white balancing operation of adjusting a rate of a pixel value for colors, based on the sensing result;
setting calculation areas having a predetermined size at a constant distance inside the white image; and
calculating the white gain values corresponding to the calculation areas.

19. The image correcting method of claim 18, wherein the performing of the white balancing operation includes:
multiplying each of red pixel values of the white image by a rate of green pixel values with respect to the red pixel values; and
multiplying each of blue pixel values of the white image by a rate of green pixel values with respect to the blue pixel values.

20. The image correcting method of claim 18, wherein the calculating of the white gain values includes:
calculating an average pixel value of white pixels, an average pixel value of red pixels, an average pixel value of green pixels, and an average pixel value of blue pixels in the calculation areas; and
determining, as the white gain values, values obtained by dividing the average pixel value of the white pixels by a sum of the average pixel value of the red pixels, the average pixel value of the green pixel, and the average pixel value of the blue pixels in the calculation areas.

21. The image correcting method of claim 17, wherein the determining of the target pixel includes:
determining, as the saturated pixels, pixels of which pixel value exceeds a predetermined reference value among a plurality of pixels;
performing a white balancing operation on normal pixels except the saturated pixels among the plurality of pixels;
setting a decision area corresponding to a white pixel among the detected saturated pixels; and
determining the saturated white pixel as the target pixel, corresponding to that red pixels, green pixels, and blue pixels among pixels included in the decision area are not included in the detected saturated pixels.

22. The image correcting method of claim 21, wherein the determining of the saturated white pixels includes determining the detected saturated pixels, based on different reference values according to colors corresponding to a pixel.

23. The image correcting method of claim 21, wherein the performing of the white balancing operation includes:
calculating a first rate of green pixel values with respect to red pixel values and a second rate of green pixel values with respect to blue pixel values; and
multiplying each of the red pixel values by the first rate, and multiplying each of the blue pixel values by the second rate.

24. The image correcting method of claim 23, wherein the setting of the decision area includes:
calculating a white gain value corresponding to the white pixel, based on the white gain values; and
determining a size of the decision area, based on the white gain value.

25. The image correcting method of claim 24, wherein the changing of the pixel value of the target pixel includes:
determining the white gain value as a white gain value of the target pixel;
calculating a peripheral pixel value as a sum of an average pixel value of red pixels, an average pixel value of green pixels, and an average pixel value of blue pixels, which are included in a decision area corresponding to the target pixel;
determining, as the pixel value of the target pixel, a value obtained by multiplying the white gain value and the peripheral pixel value; and
performing an inverse white balancing operation on the normal pixels.

26. The image correcting method of claim 25, wherein the performing of the inverse white balancing operation includes:
multiplying each of the red pixels by a reciprocal of the first rate; and
multiplying each of the blue pixels by a reciprocal of the second rate.

* * * * *